(12) United States Patent
Kim et al.

(10) Patent No.: US 12,557,660 B2
(45) Date of Patent: Feb. 17, 2026

(54) INTEGRATED CIRCUIT (IC) PROTECTIONS COMPRISING ELECTROMAGNETIC RADIATION BLOCKING MATERIAL

(71) Applicant: XILINX, INC., San Jose, CA (US)

(72) Inventors: Myongseob Kim, Pleasanton, CA (US); Henley Liu, San Jose, CA (US); Cheang-whang Chang, Mountain View, CA (US)

(73) Assignee: XILINX, INC., San Jose, CA (US)

(*) Notice: Subject to any disclaimer, the term of this patent is extended or adjusted under 35 U.S.C. 154(b) by 564 days.

(21) Appl. No.: 17/977,632

(22) Filed: Oct. 31, 2022

(65) Prior Publication Data

US 2024/0145411 A1 May 2, 2024

(51) Int. Cl.
*H01L 23/00* (2006.01)
*G06F 21/87* (2013.01)

(52) U.S. Cl.
CPC ............ *H01L 23/576* (2013.01); *G06F 21/87* (2013.01)

(58) Field of Classification Search
CPC .................................................. H01L 23/576
USPC ........................................................ 257/659
See application file for complete search history.

(56) References Cited

U.S. PATENT DOCUMENTS

| | | | |
|---|---|---|---|
| 5,861,652 A * | 1/1999 | Cole | G11C 7/24 257/908 |
| 6,781,226 B2 | 8/2004 | Huppenthal et al. | |
| 7,126,214 B2 | 10/2006 | Huppenthal et al. | |
| 7,282,951 B2 | 10/2007 | Huppenthal et al. | |
| RE42,035 E | 1/2011 | Huppenthal et al. | |
| 10,276,619 B2 | 4/2019 | Kao et al. | |
| 2020/0328164 A1 | 10/2020 | DeLaCruz et al. | |
| 2020/0401882 A1 | 12/2020 | Umuroglu et al. | |
| 2022/0115329 A1 * | 4/2022 | Kantarovsky | H01L 23/5226 |

FOREIGN PATENT DOCUMENTS

JP 2016058777 A * 4/2016 ............. H04L 9/003

* cited by examiner

*Primary Examiner* — Ajay Arora
(74) *Attorney, Agent, or Firm* — Patterson + Sheridan, LLP (57) ABSTRACT

Integrated circuit (IC) protections that prevent exposure or examination of integrated circuitry through backside analysis include a layer or mesh of an electrically conductive, electromagnetic radiation blocking material disposed over a backside of an IC device to prevent backside analysis. An electrically conductive conduit couples the material to a node of the integrated circuitry to provide a signal and/or voltage reference to the node through the layer/mesh. If the layer/mesh is tampered with, the integrated circuitry loses the voltage reference or signal thereby disabling the integrated circuitry. The IC device may include detection circuitry to monitor the node and to generate an alert and/or disable the circuitry upon tampering. The IC device may further include a support substrate, where a substrate between the material/mesh and the integrated circuitry is sufficiently thin that the IC device would be mechanically weak if the support substrate were removed.

11 Claims, 9 Drawing Sheets

INTEGRATED CIRCUIT (IC) PROTECTIONS COMPRISING ELECTROMAGNETIC RADIATION BLOCKING MATERIAL

TECHNICAL FIELD

Examples of the present disclosure generally relate to integrated circuit (IC) protections.

BACKGROUND

Integrated circuits (ICs) are ubiquitous throughout the world. ICs implemented as IC structures, such as dies or chips, usually represent large investments to bring those ICs to market. Significant costs are incurred in the processes of designing a circuit, verifying the circuit, transforming that circuit into a physical implementation, synthesizing and verifying the physical implementation, taping out the physical implementation, and fabricating the physical implementation.

An IC may embody intellectual property (IP) that is highly sensitive and/or valuable, such as IC structures, configurations, configuration parameters, and/or data stored within. Data may include programs, kernels, and/or designs that resulted from significant programming, verification, and compiling efforts.

An IC device may be susceptible to tampering and/or reverse engineering, such as through backside analysis in which infrared emissions of electron recombinations are analyzed, ultraviolet (UV) attacks to erase encryption (e.g., on one time programmable (OTP) chips), or contactless probing (such as laser voltage probing) and IR checking. These techniques capitalize on the transparency of a semiconductor substrate on which the circuit is formed to view the circuits or characteristics of the circuit from a backside of the IC device.

SUMMARY

Integrated circuit (IC) protections are disclosed herein. One example is an IC device that includes a first layer comprising integrated circuitry, a second layer comprising an electrically conductive, electromagnetic radiation blocking material, a substrate positioned between the first and second layers, and a first electrically conductive conduit that extends between the electrically conductive, electromagnetic radiation blocking material of the second layer and a first node of the integrated circuitry through a first via of the substrate.

Another example is IC device that includes integrated circuitry disposed over a first surface of a substrate, an electrically conductive, electromagnetic radiation blocking material disposed over a second surface of the substrate, and an electrically conductive conduit that extends between the electrically conductive, electromagnetic radiation blocking material and a node of the integrated circuitry through a via of the substrate.

Another example is a method that includes providing a first layer that includes integrated circuitry over a first surface of a substrate, forming a first via through the substrate to a first node of the integrated circuitry, providing a first electrically conductive conduit to the first node of the integrated circuitry through the first via of the substrate, and providing a second layer that includes an electrically conductive, electromagnetic radiation blocking material over a second surface of the substrate, in contact with the first electrically conductive conduit.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

IC devices may be susceptible to reverse engineering through backside analysis, which may expose circuit designs and data stored therein. The data may include circuit design data (e.g., configuration parameters), business data, government data, and/or personal data. Exposure of circuit designs and/or configuration parameters may permit an adverse entity to produce a competing product with significantly lower research and development costs, and a shorter time to market. The adverse entity could thus offer the competing product at a significantly lower price. Exposure of data through reverse engineering may cause or lead to significant harm to a business entity, a government entity, and/or individuals.

Moreover, emerging paradigms are increasing the need for security for IC devices and information embedded within IC devices. For example, third party data centers and cloud computing permit a user to use resources owned and operated by a third party. Field programmable gate array (FPGA)

devices are increasingly being used in such data centers and for cloud computing. The FPGA devices may be offered to users as FPGA-as-a-Service (FaaS). In such instances, a user can implement a design on an FPGA device owned and operated by a third party. The design may include intellectual property (IP) of the user. The user generally does not control physical access to the FPGA device. Controlling physical access to the FPGA device may be a significant limitation on an ability to secure the IP within the FPGA device, even where the IP is encoded or encrypted.

Embodiments herein describe integrated circuit (IC) protections that prevent exposure or examination of integrated circuitry through backside analysis.

Embodiments herein further describe techniques to automatically disable integrated circuitry and/or generate an alert if the IC protections are tampered with.

In an embodiment, an IC device includes integrated circuitry and an electrically conductive electromagnetic radiation blocking material that prevent backside analysis of the integrated circuitry, and that also conducts a signal and/or a reference voltage for the integrated circuitry. If the electrically conductive electromagnetic radiation blocking material is tampered with (e.g., to gain access to the integrated circuitry), the signal or reference voltage is interrupted, which may disable the integrated circuitry and/or may generate an alert.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

As used herein, when a first component is described as being on a second component, such description contemplates that the first component may be directly on the second component and that, e.g., the first component may be directly on a third (intervening) component that is directly on the second component. Additionally, components that are described as being bonded together may be directly bonded together or indirectly bonded together through, e.g., one or more layers formed on the respective components that are directly bonded together.

Figure 1:
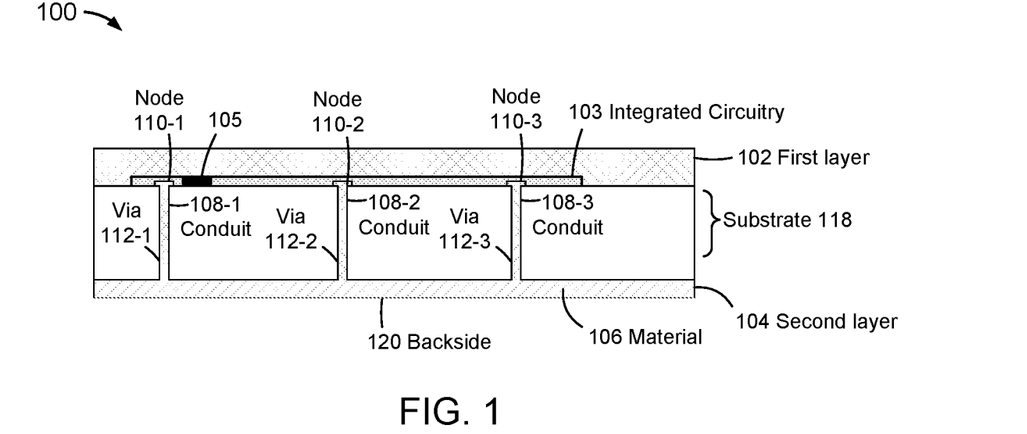
FIG. 1 is a cross-sectional view of an integrated circuit (IC) device, according to an embodiment.

FIG. 1 is a cross-sectional view of an integrated circuit (IC) device 100, according to an embodiment. IC device 100 includes a first layer 102 that includes integrated circuitry 103, a substrate 118, and one or more protective structures that contain an electrically conductive, electromagnetic radiation blocking material (material) 106. In the example of FIG. 1, the protective structures include a second layer 104 and conduits 108 formed in cavities or vias 112 of substrate 118. Substrate 118 may include silicon, and vias 112 and conduits 108 may be collectively referred to as through-silicon vias (TSVs). Substrate 118 is not, however, limited to silicon.

Material 106 may include metal and/or other material that conducts electrons and absorbs, reflects, and/or disperses electromagnetic radiation (e.g. ultraviolet or UV radiation). Material 106 may absorb, reflect, and/or disperse electromagnetic radiation directed toward a backside 120 of IC device 100 and/or may block electromagnetic radiation emitted from integrated circuitry 103. Material 106 may absorb, reflect, and/or disperse electromagnetic radiation within a first spectrum or range (e.g., infrared and/or UV radiation), and may be transparent to a second spectrum or range of electromagnetic radiation.

Material 106 may be any material that is electrically conductive and opaque to electromagnetic radiation of a target wavelength or wavelength within a subset of the spectrum of electromagnetic radiation (e.g., IR and/or UV radiation) and/or that diffuses such electromagnetic radiation sufficiently to obscure features attempted to be imaged or accessed by such electromagnetic radiation through second layer 104. In some examples, second layer 104 can be or include a metal material or metal-containing material. Specific examples of materials for the second layer 104 include titanium (Ti), titanium nitride (TiN), tantalum (Ta), tantalum nitride (TaN), and any combination thereof (e.g., multi-layers thereof). The second layer 104 can be deposited by a chemical vapor deposition (CVD), physical vapor deposition (PVD), or any other deposition process.

Conduits 108 extend between material 106 of second layer 104 and nodes 110 of integrated circuitry 103 through conduits 108. Conduits 108 provide electrical paths between material 106 of second layer 104 and nodes 110.

Second layer 104 and/or conduits 108 may be formed entirely of material 106, or material 106 may be dispersed within or throughout second layer 104 and/or conduits 108. Material 106 may be disposed over a surface of another material of second layer 104, or over a surface of another layer of IC device 100, such as substrate 118. Material 106 may be disposed over an entirety of such a surface or a portion(s) thereof. Second layer 104 may include multiple layers of material 106. Material 106 may be in a form of a mesh and/or a pattern. Second layer 104 may include multiple sections of material 106 and multiple corresponding conduits 108. Conduits 108 may include or may formed of a conductive material other than material 106.

In an embodiment, multiple conduits 108 extend from a common portion of the electrically conductive material such that respective nodes 110 are coupled to one another through the conduits 108 and the electrically conductive material. Alternatively, or additionally, second layer 104 includes multiple sections, areas, or traces of material 106 that are electrically isolated from one another. In this example, conduit 108-1 may extend between a first trace and node 110-1 through via 112-1, and conduit 108-2 may extend between the second trace and node 110-2 through via 112-2.

IC device 100 is designed such that, if second layer 104 is tampered with (e.g., removed, in whole or in part, such as by polishing or etching), such as to access and remove material 106, the tampering will disable at least a portion of integrated circuitry 103, and/or the tampering will be detectable with detection circuitry of integrated circuitry 103.

For example, in an embodiment, a control signal and/or a reference voltage (e.g., a power source or ground) is provided to node 110-1 from second layer 104 through conduit 108-1. If second layer 104 or conduit 108-1 is tampered with, the control signal and/or reference voltage may be disrupted or disconnected from node 110-1.

In an embodiment, IC device 100 is designed such that, if the control signal and/or reference voltage is disrupted or disconnected from node 110-1, integrated circuitry 103, or a portion thereof, is rendered inoperable. In an embodiment, the control signal and/or reference voltage provided to node 110-1 supports a critical feature, function, and/or block of integrated circuitry 103, such that critical feature, function, and/or block of integrated circuitry 103 is disabled upon tampering of second layer 104. Rendering integrated circuitry 103 or a portion thereof inoperable may preclude examination or tampering of integrated circuitry 103 through backside analysis.

Alternatively, or additionally, integrated circuitry 103 includes detection circuitry 105 that detects tampering of second layer 104 and/or conduits 108. Detection circuitry 105 may sense a condition or state at one or more nodes 110. Detection circuitry 105 may, for example, monitor a control signal and/or reference voltage at one or more nodes 110. Alternatively, or additionally, detection circuitry 105 may monitor a voltage, a resistance, or a conductance across/between multiple nodes 110. When detection circuitry 105 detects tampering (e.g., loss of a signal or reference voltage at a node 110 and/or a change in voltage, resistance, or conductance across/between multiple nodes 110), detection circuitry 105 may disable one or more other portions of integrated circuitry 103 (e.g., via programmable fuses/anti-fuses or e-fuses), wipe or delete data stored within integrated circuitry 103 (e.g., personal/business information, programs, and/or configuration parameters), re-configure features of integrated circuitry 103, and/or generate an alert. For example, and without limitation, integrated circuitry 103 may include communication circuitry (e.g., wireless network interface circuitry) to convey the alert to another device.

IC device 100 may include one or more additional layers, such as disclosed below with reference to FIG. 2.

Figure 2:
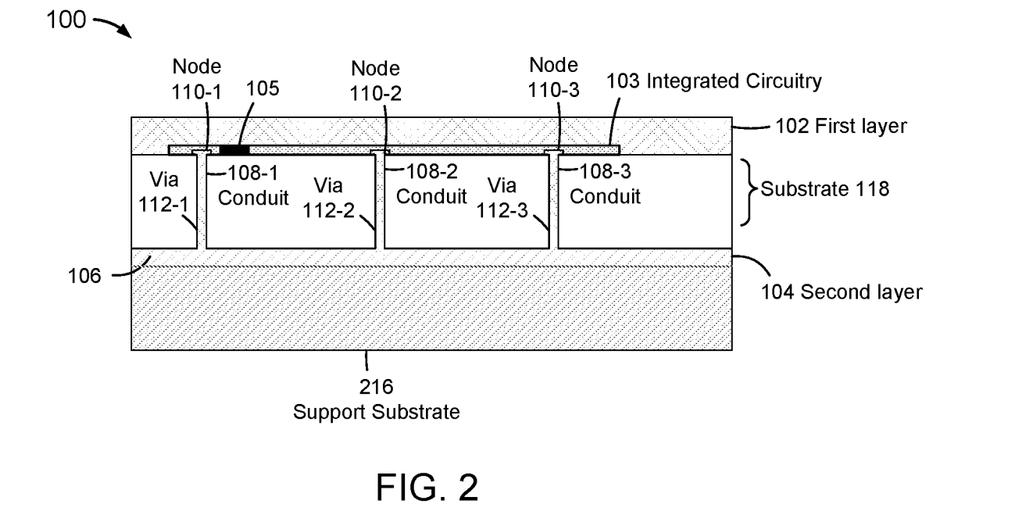
FIG. 2 is another cross-sectional view of the IC device, further including a support substrate, according to an embodiment.

FIG. 2 is a cross-sectional view of IC device 100 further including a support substrate 216, according to an embodiment.

IC device 100 may be fabricated as described in one or more examples below. IC device 100 is not, however, limited to the examples below.

Figure 3:
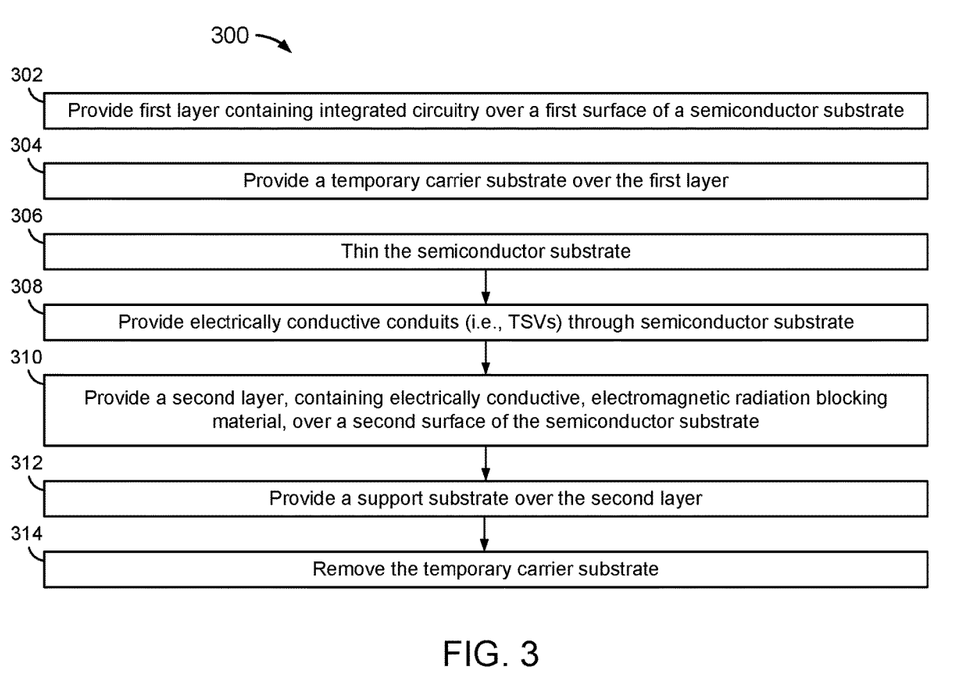
FIG. 3 is a flowchart of a method of fabricating an integrated circuit device, according to an embodiment.

FIG. 3 is a flowchart of a method 300 of fabricating an integrated circuit device, according to an embodiment. Method 300 is described below with reference to IC device 100 and FIGS. 4 through 12. Method 300 is not, however, limited to the IC device 100 or FIGS. 4 through 12. FIGS. 4 through 12 are a progression of cross-sectional views of IC device 100 over the course of a manufacturing or fabrication process, according to an embodiment.

Figure 4:
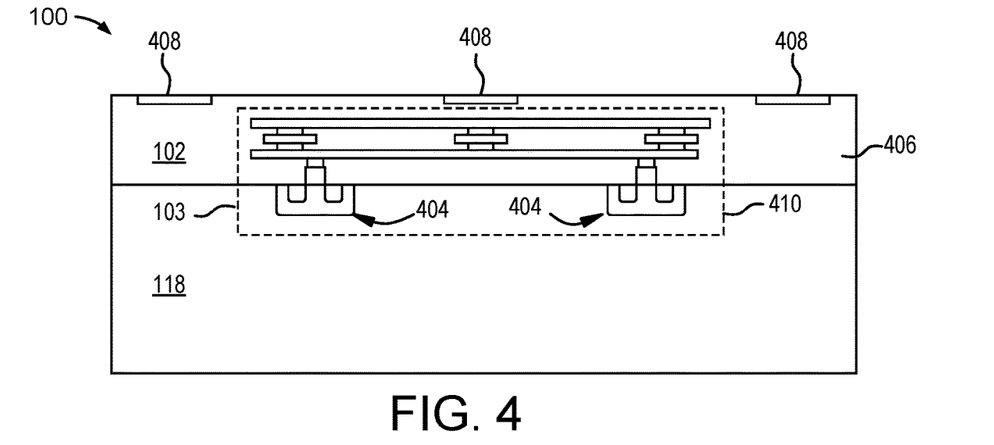
FIGS. 4 through 12 are a progression of cross-sectional views of the IC device to illustrate a manufacturing or fabrication process for the IC device, according to an embodiment.

At 302 of method 300, integrated circuitry 103 is formed on a substrate. In FIG. 4, front side processing is performed on substrate 118. Substrate 118 may be any appropriate substrate, such as a bulk semiconductor substrate, a semiconductor-on-insulator (SOI) substrate, or the like. In some examples, substrate 118 is a bulk silicon wafer. Front side processing includes forming devices 404. Devices 404 may include transistors, such as field effect transistors (FETs), and more particularly, planar or fin FETs. As illustrated but not specifically referenced, each device 404 is a transistor and includes two source/drain regions disposed in the substrate 118 and a gate structure on the substrate 118 disposed laterally between the two source/drain regions.

An interconnect structure 406 is formed on the front side of the substrate 118. Interconnect structure 406 may include a number of metal layers and dielectric layers. Each metal layer may include metal lines, vias, metal contacts, and/or other features. Each metal layer can be formed in a corresponding dielectric layer. Each dielectric layer may be referred to as an inter-layer dielectric (ILD), an inter-metal dielectric (IMD), or the like. An outer metal layer of the interconnect structure 406 is illustrated as including metal features 408 that will subsequently be electrically connected to exterior electrical connectors.

The various metal features in the interconnect structure 406 can be electrically connected together and to various devices 404 to form integrated circuitry 103. Integrated circuitry 103 is schematically outlined in the structure shown in FIG. 4 and includes various devices and metal features.

Figure 5:
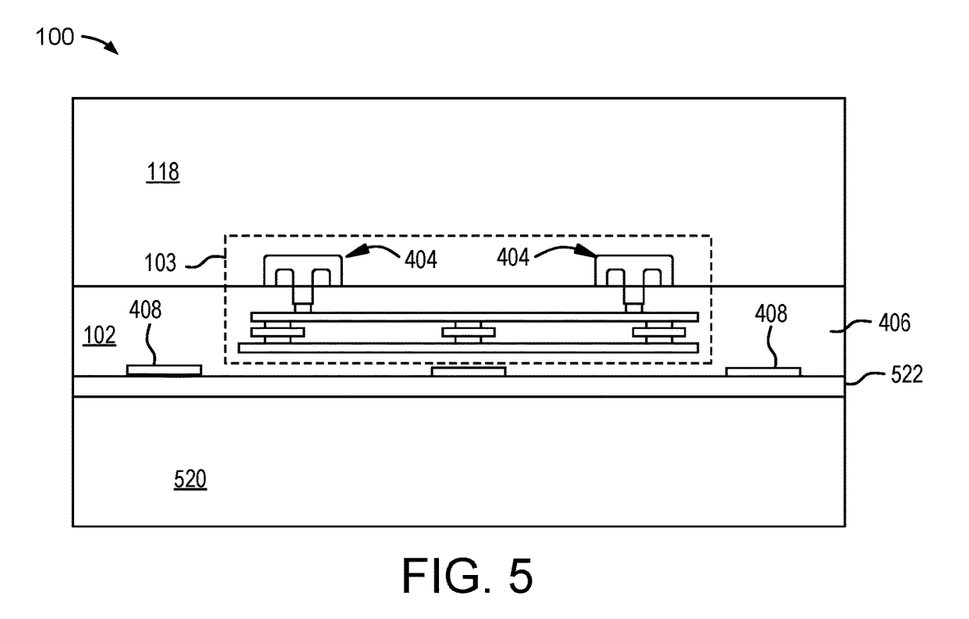

At 304, as illustrated in FIG. 5, the front side of the structure of FIG. 4 is adhered to a carrier substrate 520 by an adhesive 522. The adhesive 522 adheres the interconnect structure 406 to the carrier substrate 520. The carrier substrate 520 can be any carrier substrate that is capable of providing mechanical support to the substrate 118 and structures formed thereon during backside processing of the substrate 118. Examples of the carrier substrate 520 include a glass carrier substrate, a silicon wafer, etc. The adhesive 522 can be any appropriate adhesive, such as an ultraviolet (UV) glue that loses adhesive characteristics when exposed to UV light.

Figure 6:
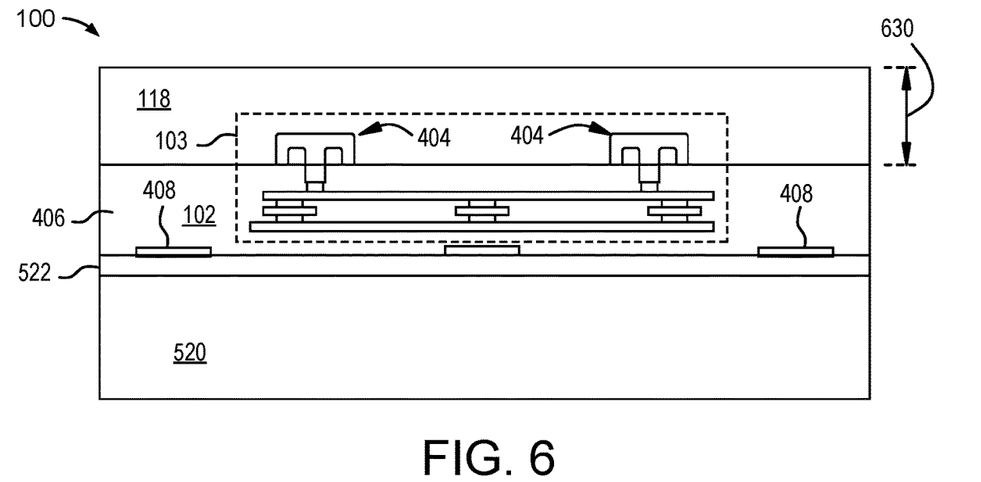

At 306, as illustrated in FIG. 6, substrate 118 may be thinned (e.g., from a backside direction), while substrate 118 is mechanically supported by the carrier substrate 520. The substrate 118 can be thinned using a chemical mechanical polish (CMP) or other grinding, polishing, or etch process. The substrate 118 can be thinned to a thickness 630 in a range from 1 micrometer ($\mu$m) to 100 $\mu$m or several hundred $\mu$m, in some examples. The substrate 118 can be thinned to other thickness in other examples. The thickness can be any amount such that second layer 104 containing material 106, which will be disposed on the backside of the substrate 118, generally cannot be physically completely removed without the substrate 118 becoming fragile and breaking.

Figure 7:
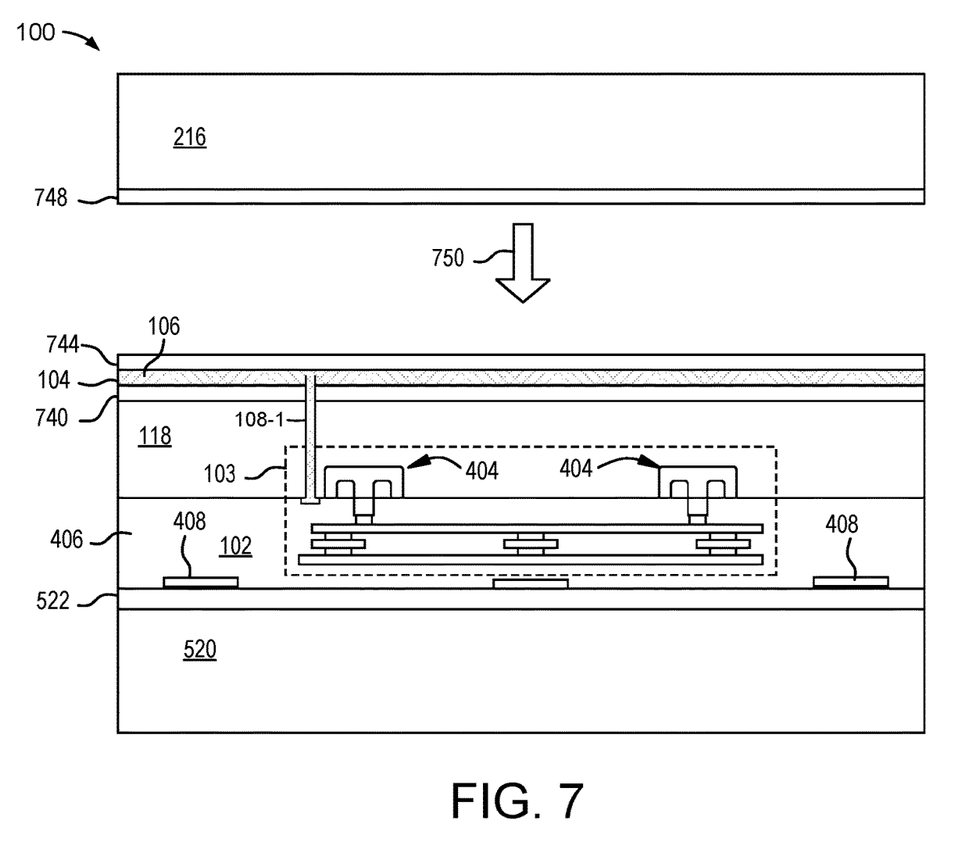

At 308, vias 112 are formed through substrate 118, and are filled with material 106 and/or other electrically conductive material to form electrically conductive conduits 108, as illustrated in FIG. 7. TSVs/electrically conductive conduits 108 may be defined, provided, or formed after thinning the substrate at 306, as illustrated in FIG. 3, or at another point of the process. For example, and without limitation, TSVs/electrically conductive conduits 108 may be defined at an early stage of the process or at the beginning of the process (e.g., prior to providing integrated circuitry at 302).

At 310, material 106 is deposited on the backside of the substrate 118 to form second layer 104, as illustrated in FIG. 7.

Other layers can be formed and/or deposited on the backside of the substrate 118. As shown, a dielectric layer 740 may be formed or deposited on the backside of the substrate 118, second layer 104 may be deposited on the dielectric layer 740, and a first bonding layer 144 may be deposited over second layer 104.

In some examples, the dielectric layer 740 can be omitted (e.g., such that the second layer 104 is deposited directly on the substrate 118). In examples where the dielectric layer 740 is included, as in FIG. 7, the dielectric layer 740 can be any dielectric material, which may serve a desired purpose. For example, the dielectric layer 740 can be a diffusion barrier layer. If the second layer 104 is a layer of metal, the dielectric layer 740 may be a diffusion barrier layer, such as including or being silicon nitride (SiN) or the like, to prevent metal atoms from the second layer 104 from diffusing into the substrate 118 and potentially degrading the devices 404 formed in the substrate 118. In some examples, the dielectric layer 740 can be an adhesion layer, such as including an oxide or the like, that promotes or improves adhesion between the substrate 118 and second layer 104. The dielectric layer 740 can be formed by oxidation, CVD, or any other formation or deposition process.

In FIG. 7, a first bonding layer 744 is deposited over second layer 104. In some examples, the first bonding layer 744 can be omitted. In examples where the first bonding layer 744 is included, like illustrated, the first bonding layer 744 can be any material that promotes or improves bonding, as described subsequently. In some examples, the first bonding layer 744 is or includes a dielectric material, such as an oxide. In further examples, the first bonding layer 744 can also include metal features (e.g., metal pads, such as copper (Cu) pads) at a bonding surface. The first bonding layer 744 can be formed or deposited using CVD, PVD, or other deposition processes. If metal features are included in the first bonding layer 744, the metal features may be deposited using plating, PVD, CVD, or the like.

A second bonding layer 748 is formed or deposited on a support substrate 216. The support substrate 216 can be any substrate capable of mechanically supporting the substrate 118 and components formed thereon. The support substrate 216 can be, for example, a bulk semiconductor substrate (e.g., a bulk silicon wafer), a glass substrate, an aluminum oxide substrate, or the like. The support substrate 216 can have a thickness in the resulting IC structure that is the original thickness of the support substrate 216 as bonded. In some examples, the support substrate 216 can be thinned, such as by CMP, after bonding to achieve a target thickness of the resulting IC structure. The support substrate 216 can be thicker than the thickness 630 of the substrate 118. In some examples, the second bonding layer 748 can be omitted. In examples where the second bonding layer 748 is included, like illustrated, the second bonding layer 748 can be any material that promotes or improves bonding, as described subsequently. In some examples, the second bonding layer 748 is or includes a dielectric material, such as an oxide. In further examples, the second bonding layer 748 can also include metal features (e.g., metal pads, such as copper (Cu) pads) at a bonding surface. The second bonding layer 748 can be formed or deposited using oxidation, CVD, PVD, or other deposition processes. If metal features are included in the second bonding layer 748, the metal features may be deposited using plating, PVD, CVD, or the like.

Figure 9:
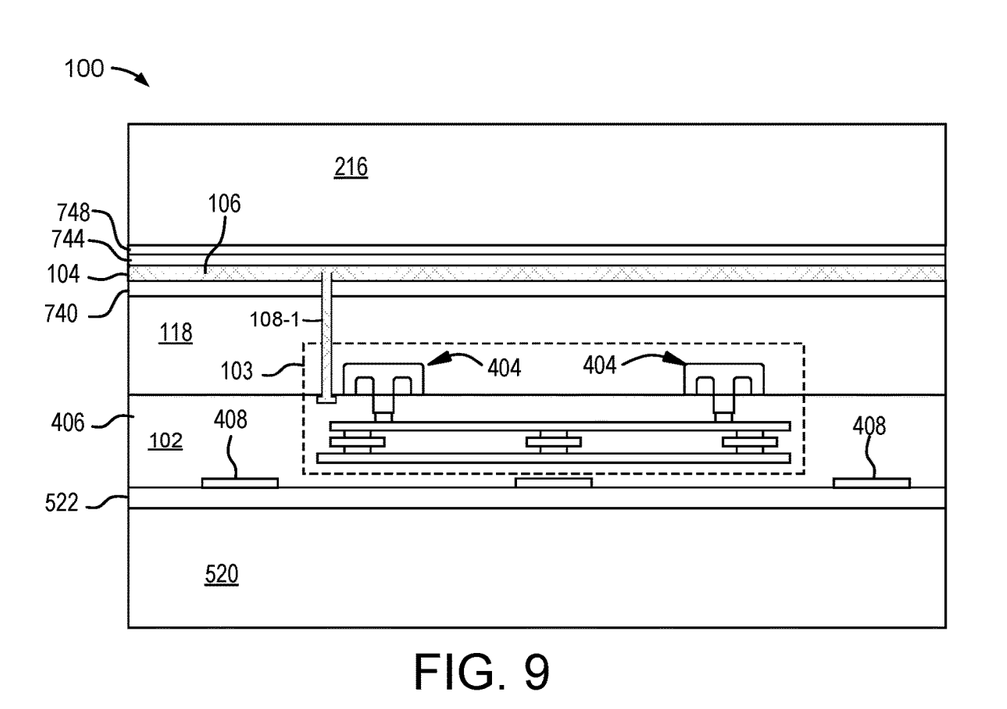
Figure 10:
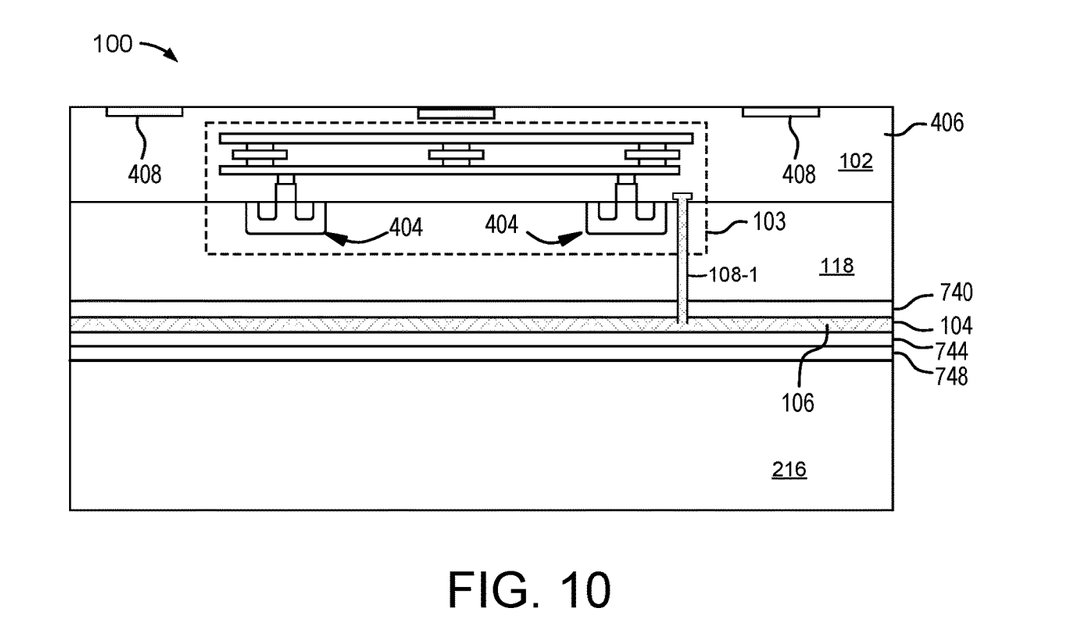

At 312, support substrate 216 is brought together (as indicated by arrow 750 in FIG. 7) with the backside of the substrate 118, and the substrate 118 and the support substrate 216 are bonded together, as shown in FIG. 9. In the illustrated example, the first bonding layer 744 and the second bonding layer 748 are contacted and bonded together. A bonding interface is between the first bonding layer 744 and the second bonding layer 748. The bonding is, for example, at the wafer level (e.g., wafer-to-wafer bonding). The bonding can be dielectric-to-dielectric bonding (e.g., oxide-to-oxide bonding), hybrid bonding (e.g., including dielectric-to-dielectric and metal-to-metal bonding), or any other bonding. The bonding mechanism (e.g., dielectric-to-dielectric, hybrid, etc.) can be based on the materials and/or layers implemented at the bonding interface, as would be understood by a person having ordinary skill in the art.

In some specific examples, the dielectric layer 740, second layer 104, first bonding layer 744, and second bonding layer 748 are implemented as shown in FIGS. 7 and 9. In the specific examples, each of the dielectric layer 740, the first bonding layer 744, and the second bonding layer 748 is silicon oxide, and the second layer 104 is Ti, TiN, Ta, or TaN.

Figure 8:
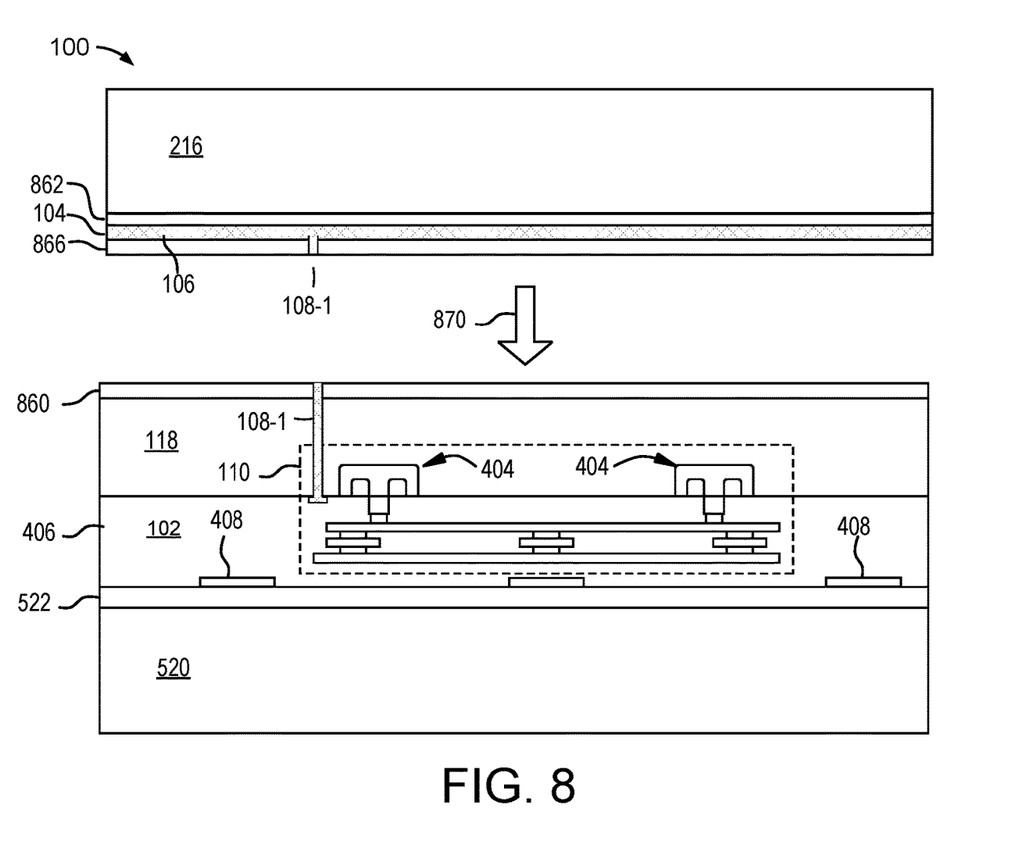

Various modifications relating to which of the substrate 118 or support substrate 216 the various layers are formed and/or deposited on can be implemented. FIG. 8 illustrates a variation from FIG. 7. In FIG. 8, a first bonding layer 860 is formed or deposited on the backside of the substrate 118. A dielectric layer 862 is formed or deposited on the support substrate 216. Second layer 104 containing material 106 is deposited over dielectric layer 862. A second bonding layer 866 is deposited over second layer 104. These layers can include materials like described above, and can be deposited or formed as described above. Various considerations for the layers (e.g., diffusion, adhesion, bonding, etc.) can be as described above. The support substrate 216 is brought together (as indicated by arrow 870) with the backside of the substrate 118, and the substrate 118 and the support substrate 216 are bonded together. In the illustrated example, the first bonding layer 860 and the second bonding layer 866 are contacted and bonded together. A bonding interface is between the first bonding layer 860 and the second bonding layer 866. Although the configuration resulting from the processing described with respect to FIG. 8 is not illustrated in subsequent figures, a person having ordinary skill in the art will readily understand how the following description applies to such configuration.

Figure 11:
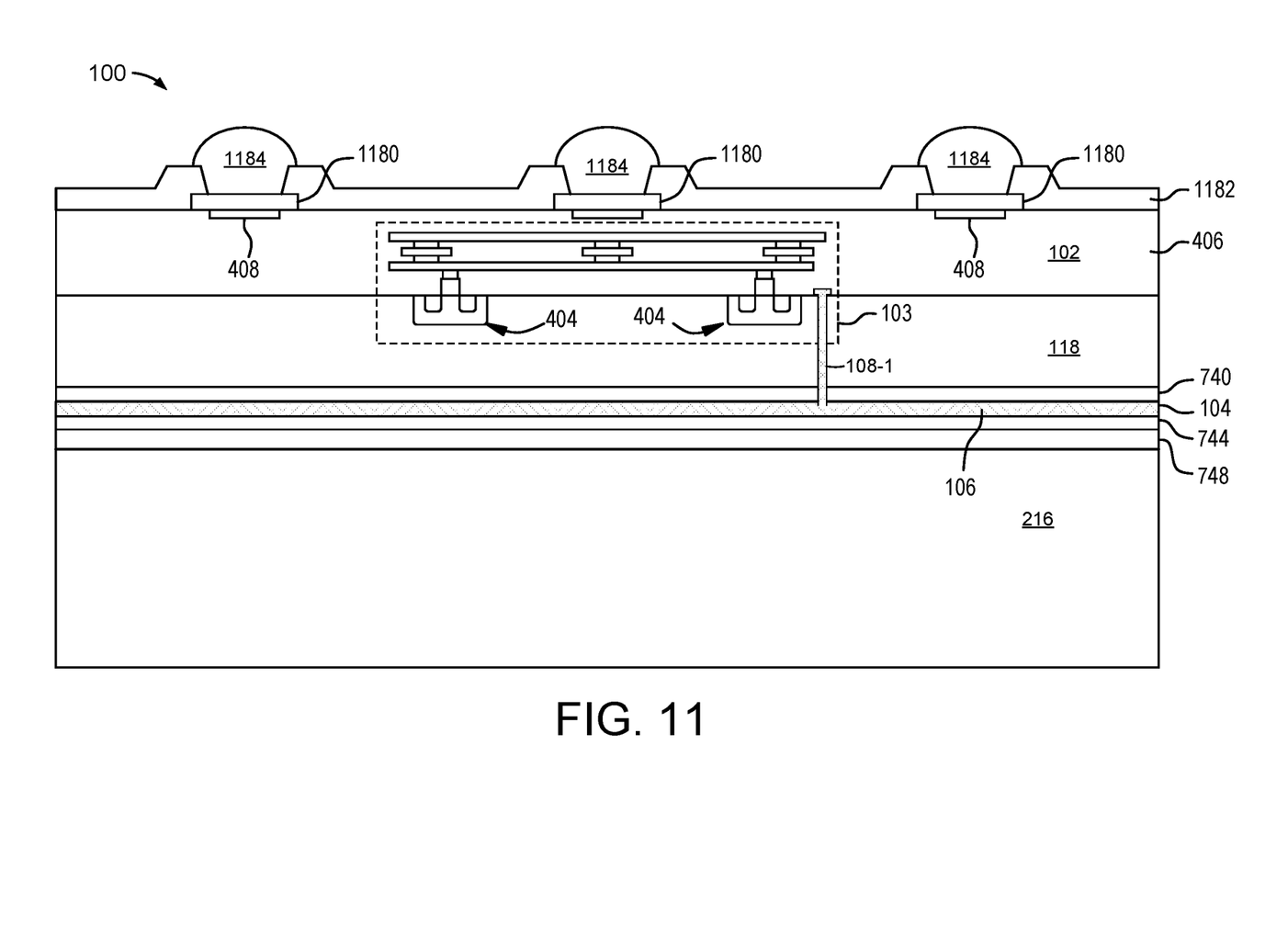

At 314, the carrier substrate 520 is removed. Referring to FIG. 11, after bonding the support substrate 216 to the substrate 118, the carrier substrate 520 is released from the substrate 118. For example, if the adhesive 522 is a UV glue, the adhesive 522 is exposed to UV light to release the carrier substrate 520 from the substrate 118.

Referring to FIG. 11, exterior electrical connector processing is performed. As illustrated, respective metal pads 1180 (e.g., aluminum (Al) pads) are formed on and/or electrically connected to metal features 408, and further, on the interconnect structure 406. A passivation layer 1182 is formed on the interconnect structure 406 and over at least laterally outer portions of the metal pads 1180. Center portions of the metal pads 1180 are exposed through respective openings through the passivation layer 1182. Exterior electrical connectors 1184 are formed on respective metal pads 1180 exposed through the passivation layer 1182. The exterior electrical connectors 1184 can be, for example, microbumps, controlled collapse chip connection (C4) bumps, or the like. Each exterior electrical connector 1184 can be or include solder. Each exterior electrical connector 1184 can also include multiple metal layers (e.g., under bump metallization (UBM)), a metal pillar, or the like. Various processing can be used implement the metal pads 1180, passivation layer 1182, and exterior electrical connectors 1184, which is readily understood by a person having ordinary skill in the art, and is therefore omitted for brevity. Other components and/or processing can be implemented as part of the exterior electrical connector processing.

As noted previously, various processing can be performed in different orders. As an example, the metal pads 1180 and passivation layer 1182 described with respect to FIG. 11 can be formed subsequent to the processing described with respect to FIG. 4 and before adhering the front side of the substrate 118 to the carrier substrate 520 in FIG. 5. In such an example, the passivation layer 1182 and, possibly, the metal pads 1180 are adhered to the adhesive 522. Other modifications can be made.

After the exterior electrical connector processing of FIG. 11, individual IC structures can be singulated (e.g., from the wafer). The singulation may be by sawing or dicing, for example. An individual IC structure can be as illustrated in FIG. 11 and may further be incorporated into an IC package (e.g., including a package substrate, underfill, an encapsulant, etc.). An individual IC structure as illustrated in FIG. 11 can be referred to as an IC die or IC chip, even with the stacked substrate 118 and support substrate 216.

As shown in FIG. 11, the second layer 104 is disposed on the backside side of the substrate 118. Further, the second layer 104 is disposed between the substrate 118 on which devices 404 and integrated circuitry 103 are formed and the support substrate 216. The second layer 104 is disposed on the side of the substrate 118 opposite from the side of the substrate 118 on which the devices 404, the interconnect structure 406, and/or exterior electrical connectors are formed and are disposed.

In some examples, the second layer 104 is a blanket layer covering or disposed on an entirety of or throughout the backside of the substrate 118 of the IC structure. In some examples, the second layer 104 is a blanket layer covering or disposed on less than an entirety of the backside of the substrate 118 of the IC structure, such as covering or disposed on only one or more portions of the backside of the substrate 118 that align (e.g., vertically in the illustrated orientation) with the circuit(s) on the IC structure that are to be protected. For example, the second layer 104 may extend sufficiently laterally to prevent or obscure imaging or access of the circuit(s) to be protected. In further examples, the second layer 104 can be patterned while providing sufficient protection to prevent or obscure imaging or access of the circuit(s) to be protected.

The second layer 104 may be electrically isolated on the backside of the substrate 118. For example, when the second layer 104 is electrically conductive, such as when the second layer 104 is a metal or a metal-containing material, the second layer 104 may include dielectric layers disposed on opposing sides of the second layer 104, such as described in one or more examples herein. The electrically conductive material of second layer 104 may be electrically connected to metal features of integrated circuitry 103 and/or interconnect structure 406 through conduits 108. IC device 100 may include one or more other electrically conductive conduits that couple the electromagnetic radiation blocking material of second layer 104 to ground.

If an adverse entity became in possession of IC device 100 and desired to image or access the integrated circuitry 103 or data stored on the integrated circuitry 103, the adverse entity may be prevented from imaging the structures or accessing data of the integrated circuitry 103 through the backside of IC device 100 due to the presence of material 106 of second layer 104.

For the adverse entity to attempt to image the integrated circuitry 103 or access the data, the adverse entity would have to remove at least portions of the electrically conductive material of second layer 104 and the electromagnetic radiation blocking material of second layer 104, which would require removing the support substrate 216. Where substrate 118 has been thinned to a small thickness, it is contemplated that once the support substrate 216 has been removed, the substrate 118 (which has been singulated from a larger wafer) would lack the structural integrity to remain intact. That is, the substrate 118 would become fragile. The lack of structural integrity would likely result in the substrate 118 breaking, which would impact the integrity of integrated circuitry 103.

Moreover, the adverse entity would need to remove the electrically conductive material of second layer 104, or a portion thereof. As described further above, tampering with the electrically conductive material of second layer 104 may disable integrated circuitry 103, or portions thereof, and/or may cause detection circuitry of IC device 100 to generate an alert.

Figure 12:
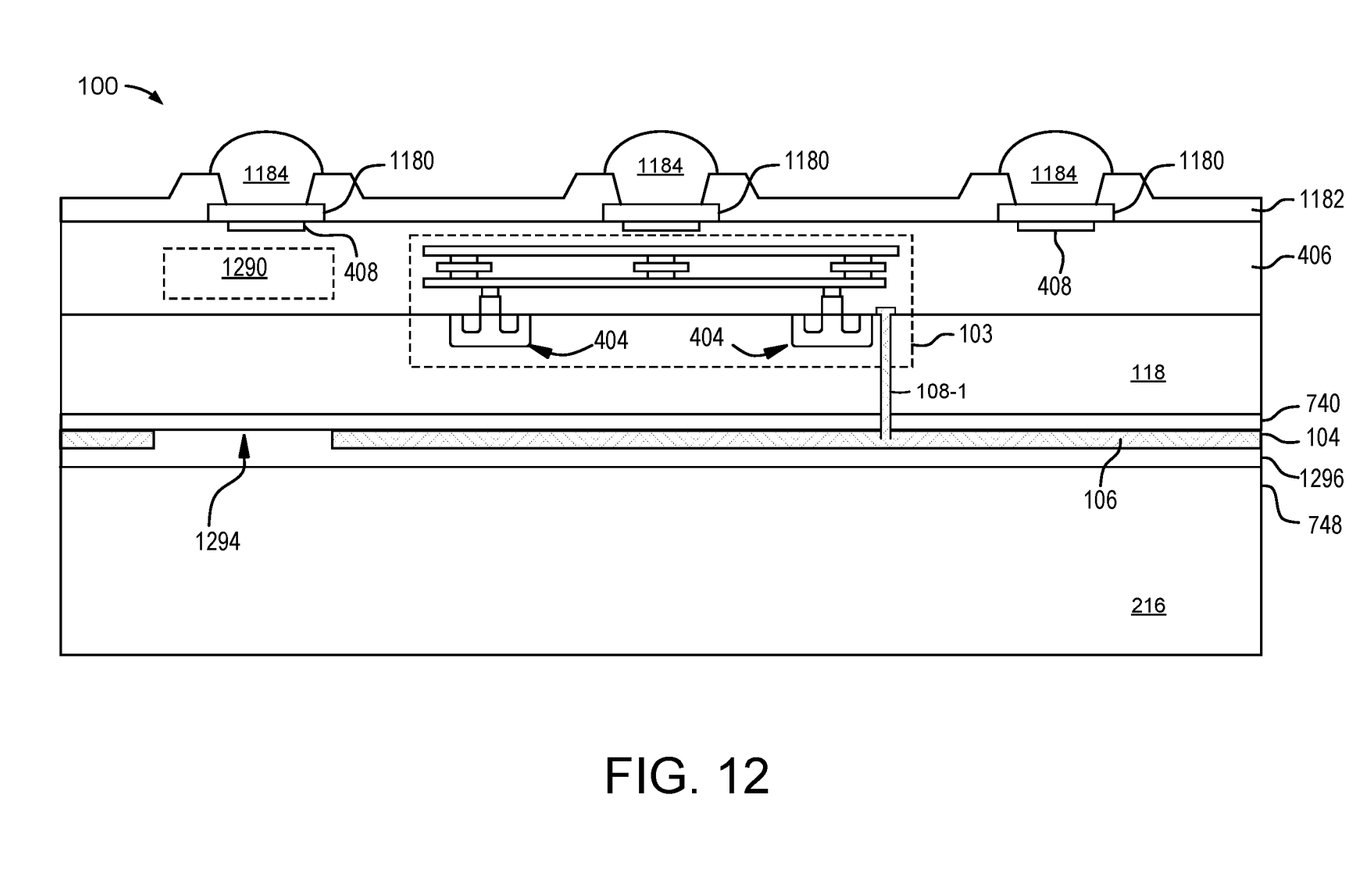

FIG. 12 illustrates a cross-sectional view of IC device 100, according to an embodiment. In the example of FIG. 12, second layer 104 is patterned in that material 106 is omitted from a portion or region to provide an opening 1294. In this example, a circuit 1290 may not be protected by second layer 104. Circuit 1290 may include devices formed in or on the substrate 118 and/or in the interconnect structure 406. Circuit 1290 may include, for example, an inductor formed of metal features in the interconnect structure 406.

In an embodiment, dielectric layer 740 is formed or deposited as described above with respect to FIG. 7, and the electromagnetic radiation blocking material of second layer 104 is deposited and patterned on dielectric layer 740. In an alternative embodiment, dielectric layer 740 may be omitted. In FIG. 12, material 106 is patterned to have an opening 1294 that vertically aligns with circuit 1290. In some examples, material 106 may be blanket deposited and subsequently etched using photolithography and etching processes to pattern material 106. In some examples, material 106 can be deposited patterned, such as by plating. For example, a seed layer can be deposited by PVD on the dielectric layer 740. A photoresist can be deposited and patterned using photolithography, which patterning exposes portions of the seed layer where material 106 is to be deposited. Material 106 can be deposited by plating on the exposed portions of the seed layer. The photoresist can be removed by ashing, and subsequently, remaining exposed portions of the seed layer can be removed by etching. Any other appropriate processes can be used.

Further in FIG. 12, a first bonding layer 1296 is deposited on second layer 104 and in the opening 1294. The first bonding layer 1296 fills the opening 1294. The first bonding layer 1296 can be deposited and can be a same or similar material as described above with respect to the first bonding layer 744 in FIG. 7. Additionally, the first bonding layer 1296 can further be planarized, such as by a CMP, to remove topography that may result from the presence of the opening 1294. The planarization may improve the subsequent bonding of the first bonding layer 1296 to the second bonding layer 748, such as described above with respect to FIG. 7.

Various considerations may determine how material 106 of second layer 104 may or may not be patterned. In the specific example where the circuit 1290 includes an inductor and material 106 of second layer 104 is a metal or metal-containing material, the patterning of material 106 with opening 1294 may reduce parasitic coupling of the inductor in circuit 1290 compared to if the material 106 was a blanket layer covering an entirety of the backside of the substrate 118. The reduction in parasitic coupling may reduce degradation of the inductor.

IC device 100 may represent one or more of a variety of types of devices or a portion thereof. For example, IC device 100 may be or include a field programmable gate array (FPGA). Integrated circuitry 103 may include an FPGA, alone and/or in combination with other circuits or IP blocks. IC device 100 or integrated circuitry 103 may represent a system-on-chip (SoC). Various modification and permutations of circuits, with or without patterning of an electromagnetic radiation blocking layer, can be implemented.

Integrated circuitry 103 may include one or more of a variety of types of circuit blocks, such as described below with reference to FIG. 13.

Figure 13:
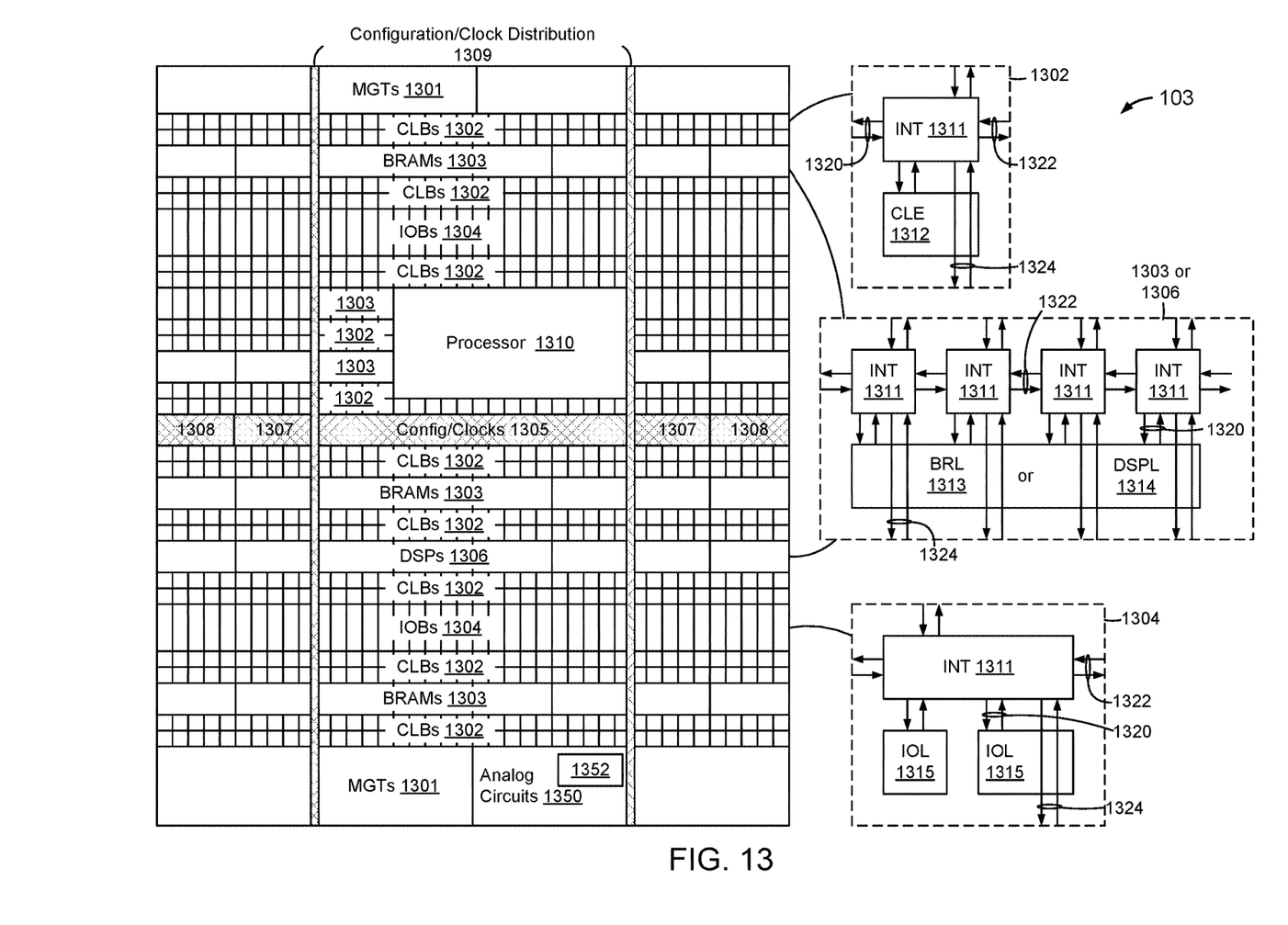
FIG. 13 is a block diagram of integrated circuitry of the IC device, including an array of configurable or programmable circuit blocks or tiles, according to an embodiment.

FIG. 13 is a block diagram of integrated circuitry 103, including an array of configurable or programmable circuit blocks or tiles, according to an embodiment. The example of FIG. 13 may represent a field programmable gate array (FPGA) and/or other IC devices that utilize configurable interconnect structures for selectively coupling circuitry/logic elements, such as complex programmable logic devices (CPLDs).

In the example of FIG. 13, the tiles include multi-gigabit transceivers (MGTs) 1301, configurable logic blocks (CLBs) 1302, block random access memory (BRAM) 1303, input/output blocks (IOBs) 1304, configuration and clocking logic (Config/Clocks) 1305, digital signal processing (DSP) blocks 1306, specialized input/output blocks (I/O) 1307 (e.g., configuration ports and clock ports), and other programmable logic 1308, which may include, without limitation, digital clock managers, analog-to-digital converters, and/or system monitoring logic. The tiles further includes a dedicated processor 1310.

One or more tiles may include a programmable interconnect element (INT) 1311 having connections to input and output terminals 1320 of a programmable logic element within the same tile and/or to one or more other tiles. A programmable INT 1311 may include connections to interconnect segments 1322 of another programmable INT 1311 in the same tile and/or another tile(s). A programmable INT 1311 may include connections to interconnect segments 1324 of general routing resources between logic blocks (not shown). The general routing resources may include routing channels between logic blocks (not shown) including tracks of interconnect segments (e.g., interconnect segments 1324) and switch blocks (not shown) for connecting interconnect segments. Interconnect segments of general routing resources (e.g., interconnect segments 1324) may span one or more logic blocks. Programmable INTs 1311, in combination with general routing resources, may represent a programmable interconnect structure.

A CLB 1302 may include a configurable logic element (CLE) 1312 that can be programmed to implement user logic. A CLB 1302 may also include a programmable INT A BRAM 1303 may include a BRAM logic element (BRL) 1313 and one or more programmable INTs 1311. A number of interconnect elements included in a tile may depends on a height of the tile. A BRAM 1303 may, for example, have a height of five CLBs 1302. Other numbers (e.g., four) may also be used.

A DSP block 1306 may include a DSP logic element (DSPL) 1314 in addition to one or more programmable INTs 1311. An IOB 1304 may include, for example, two instances of an input/output logic element (IOL) 1315 in addition to one or more instances of a programmable INT 1311. An I/O pad connected to, for example, an I/O logic element 1315, is not necessarily confined to an area of the I/O logic element 1315.

In the example of FIG. 13, config/clocks 1305 may be used for configuration, clock, and/or other control logic. Vertical columns 1309 may be used to distribute clocks and/or configuration signals.

A logic block (e.g., programmable of fixed-function) may disrupt a columnar structure of integrated circuitry 103. For example, processor 1310 spans several columns of CLBs 1302 and BRAMs 1303. Processor 1310 may include one or more of a range of components such as, without limitation, a single microprocessor to a complete programmable processing system of microprocessor(s), memory controllers, and/or peripherals.

In FIG. 13, integrated circuitry 103 further includes analog circuits 1350, which may include, without limitation, one or more analog switches 1352, multiplexers, and/or de-multiplexers. Analog switches 1352 may be useful to reduce leakage current.

FIG. 13 is provided for illustrative purposes. Integrated circuitry 103 is not limited to numbers of logic blocks in a row, relative widths of the rows, numbers and orderings of rows, types of logic blocks included in the rows, relative sizes of the logic blocks, illustrated interconnect/logic implementations, or other example features of FIG. 13.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An integrated circuit (IC) device, comprising:
   a first layer comprising integrated circuitry;
   a second layer comprising an electrically conductive, electromagnetic radiation blocking material;
   a substrate positioned between the first and second layers; and
   a first and second electrically conductive conduits that extends between the electrically conductive, electromagnetic radiation blocking material of the second layer and a respective first and second nodes of the integrated circuitry through a first and second vias of the substrate; and
   detection circuitry configured to detect tampering of one or more of the electrically conductive, electromagnetic radiation blocking material, the first electrically conductive conduit, and the second electrically conductive conduit based on one or more of a voltage and a resistance between the first and second nodes of the integrated circuitry.

2. The IC device of claim 1, wherein the detection circuitry is further configured to perform a function based on the tampering, wherein the function comprises one or more of:
   disabling one or more portions of the integrated circuitry with one or more of programmable fuses and programmable anti-fuses;
   deleting data stored within integrated circuitry; and
   re-configuring features of the integrated circuitry.

3. The IC device of claim 2, wherein the detection circuitry is further configured disable at least a portion of the integrated circuitry when the electrically conductive, electromagnetic radiation blocking material of the second layer is removed.

4. The IC device of claim 1, wherein the detection circuitry is further configured to detect the tampering based on the resistance between the first and second nodes of the integrated circuitry.

5. The IC device of claim 4, wherein the detection circuitry is further configured to:
   generate an alert based on the tampering.

6. The IC device of claim 4, wherein the detection circuitry is further configured to:
   disable a function of the integrated circuitry based on the tampering.

7. The IC device of claim 4, wherein the detection circuitry is further configured to:
   erase the data stored within the integrated circuitry IC device based on the tampering.

8. The IC device of claim 4, wherein the detection circuitry is further configured to detect the tampering based on the voltage between the first and second nodes of the integrated circuitry.

9. The IC device of claim 1, wherein:
   the electrically conductive, electromagnetic radiation blocking material comprises first and second sections;
   the first and second sections are electrically isolated from one another;

the first and second electrically conductive conduits extends between the first section and the respective first and second nodes of the integrated circuitry; and the IC device further comprises third and fourth electrically conductive conduits that extends between the second section and respective third and fourth nodes of the integrated circuitry through respective third and fourth vias of the first substrate.

10. An integrated circuit (IC) device, comprising:

integrated circuitry disposed over a first surface of a substrate;

an electrically conductive, electromagnetic radiation blocking material disposed over a second surface of the substrate; and first and second electrically conductive conduits that extends between the electrically conductive, electromagnetic radiation blocking material and respective first and second nodes of the integrated circuitry through respective first and second vias of the substrate; and detection circuitry configured to detect tampering of one or more of the electrically conductive, electromagnetic radiation blocking material, the first electrically conductive conduit, and the second electrically conductive conduit based on one or more of a voltage and a resistance between the first and second nodes of the integrated circuitry.

11. The IC device of claim 10, wherein:

the electrically conductive, electromagnetic radiation blocking material includes multiple layers of the electrically conductive, electromagnetic radiation blocking material disposed over the second surface of the substrate; and the first and second electrically conductive conduits are coupled to one or more of the layers of the electrically conductive, electromagnetic radiation blocking material.

* * * * *